(12) United States Patent
Watanabe et al.

(10) Patent No.: US 10,474,898 B2
(45) Date of Patent: Nov. 12, 2019

(54) IMAGE PROCESSING APPARATUS FOR VEHICLE

(71) Applicant: AISIN SEIKI KABUSHIKI KAISHA, Kariya-shi, Aichi (JP)

(72) Inventors: Kazuya Watanabe, Anjo (JP); Naotaka Kubota, Kariya (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 15/755,308

(22) PCT Filed: Sep. 14, 2016

(86) PCT No.: PCT/JP2016/077086
§ 371 (c)(1),
(2) Date: Feb. 26, 2018

(87) PCT Pub. No.: WO2017/056989
PCT Pub. Date: Apr. 6, 2017

(65) Prior Publication Data
US 2019/0026557 A1  Jan. 24, 2019

(30) Foreign Application Priority Data

Sep. 30, 2015 (JP) ................................. 2015-194335
Jun. 17, 2016 (JP) ................................. 2016-121160

(51) Int. Cl.
*G06K 9/00* (2006.01)
*B60R 1/00* (2006.01)
(Continued)

(52) U.S. Cl.
CPC ............ *G06K 9/00671* (2013.01); *B60R 1/00* (2013.01); *B60R 21/00* (2013.01);
(Continued)

(58) Field of Classification Search
None
See application file for complete search history.

(56) References Cited

U.S. PATENT DOCUMENTS 8,384,782 B2 * 2/2013 Hiroshi ..................... B60R 1/00
340/435
9,672,432 B2 * 6/2017 Yamamoto ............. G08G 1/166
(Continued)

FOREIGN PATENT DOCUMENTS

JP 2004147083 A 5/2004
JP 2005-186906 A 7/2005
(Continued)

OTHER PUBLICATIONS

International Search Report for PCT/JP2016/077086, dated Nov. 29, 2016.
(Continued)

*Primary Examiner* — Reza Aghevli
(74) *Attorney, Agent, or Firm* — Sughrue Mion, PLLC

(57) ABSTRACT

An image processing apparatus for a vehicle includes a viewpoint image generation portion generating a viewpoint image in which a three-dimensional virtual projection surface surrounding a periphery of a vehicle is viewed from a virtual viewpoint, and a captured image of vehicle surroundings is projected onto the virtual projection surface, and the apparatus includes a marking image generation portion generating a marking image indicating a specific position on the virtual projection surface, and an output image generation portion generating an output image including the viewpoint image and the marking image.

11 Claims, 10 Drawing Sheets

(51) Int. Cl.
*B60R 21/00* (2006.01)
*G06T 1/00* (2006.01)
*H04N 7/18* (2006.01)
*G06T 17/20* (2006.01)
*G06T 19/00* (2011.01)
*H04N 13/111* (2018.01)

(52) U.S. Cl.
CPC ............ *G06K 9/00791* (2013.01); *G06T 1/00* (2013.01); *G06T 17/20* (2013.01); *G06T 19/006* (2013.01); *H04N 7/18* (2013.01); *H04N 13/111* (2018.05); *G06T 2207/30252* (2013.01)

(56) References Cited

U.S. PATENT DOCUMENTS

| | | | | |
|---|---|---|---|---|
| 2010/0245573 | A1* | 9/2010 | Gomi | B60R 1/00 348/148 |
| 2013/0141547 | A1 | 6/2013 | Shimizu | |
| 2013/0155241 | A1 | 6/2013 | Tanuki et al. | |
| 2014/0063197 | A1* | 3/2014 | Yamamoto | G08G 1/166 348/46 |
| 2014/0333729 | A1* | 11/2014 | Pflug | G06T 15/20 348/47 |
| 2014/0347450 | A1* | 11/2014 | Han | B60R 1/00 348/48 |
| 2015/0098623 | A1 | 4/2015 | Shimizu | |

FOREIGN PATENT DOCUMENTS

| | | | | | |
|---|---|---|---|---|---|
| JP | 2005186906 | A | * | 7/2005 | ............ B60R 21/00 |
| JP | 2007-91157 | A | | 4/2007 | |
| JP | 2007091157 | A | * | 4/2007 | ............... B60R 1/00 |
| JP | 2008149878 | A | * | 7/2008 | ............... B60R 1/00 |
| JP | 2011182059 | A | * | 9/2011 | ............... H04N 7/18 |
| JP | 2013-207637 | A | | 10/2013 | |
| JP | 201320763 | A | * | 10/2013 | ............... H04N 7/18 |
| JP | 2013207637 | A | * | 10/2013 | ............... H04N 7/18 |
| JP | 5369465 | B2 | | 12/2013 | |

OTHER PUBLICATIONS

Communication dated Aug. 14, 2018, from the European Patent Office in counterpart application No. 16851163.2.

* cited by examiner

IMAGE PROCESSING APPARATUS FOR VEHICLE

CROSS REFERENCE TO RELATED APPLICATIONS

This application is a National Stage of International Application No. PCT/JP2016/077086 filed Sep. 14, 2016, claiming priority based on Japanese Patent Application No. 2015-194335 filed Sep. 30, 2015 and Japanese Patent Application No. 2016-121160 filed Jun. 17, 2016.

TECHNICAL FIELD

The embodiment of the present invention relates to an image processing apparatus for a vehicle.

BACKGROUND ART

An image processing apparatus is conventionally known, which generates image data in which a captured image is reflected in three dimensions, and converts the generated image data into an image viewed from a set viewpoint so that the converted image corresponds to an output image.

DOCUMENT OF PRIOR ART

Patent Document

Patent document 1: JP5369465B

OVERVIEW OF INVENTION

Problem to be Solved by Invention

In the image processing apparatus of this type, for example, it is meaningful that a position of an object included in an output image is recognized more easily.

Means for Solving Problem

For example, an image processing apparatus for a vehicle of the embodiment includes a viewpoint image generation portion generating a viewpoint image in which a three-dimensional virtual projection surface surrounding a periphery of a vehicle is viewed from a virtual viewpoint, a captured image of vehicle surroundings being projected onto the virtual projection surface. The image processing apparatus for a vehicle of the embodiment includes a marking image generation portion generating a marking image indicating a specific position on the virtual projection surface, and an output image generation portion generating an output image including the viewpoint image and the marking image. Consequently, according to the present embodiment, in the output image, a position and/or size of an object is recognized more easily on the basis of the marking image indicating the specific position on the virtual projection surface, for example.

In addition, in the above-described image processing apparatus for a vehicle, for example, the marking image indicates a portion of the virtual projection surface, the portion including a predetermined height in an upper-and-lower direction of the vehicle. Consequently, in the output image, a position of an object in the upper-and-lower direction and/or a height of the object are recognized more easily on the basis of the marking image, for example.

In addition, in the above-described image processing apparatus for a vehicle, for example, the marking image includes a first marking image indicating a portion of the virtual projection surface, the portion including a height that is same as a ground surface. Consequently, in the output image, a position of the ground surface, a distance from the ground surface to the object and/or a height of the object from the ground surface is recognized more easily on the basis of the first marking image, for example.

In addition, in the above-described image processing apparatus for a vehicle, for example, the marking image includes a second marking image indicating a portion of the virtual projection surface, the portion including a height that is same as a protruding portion protruding at a vehicle body towards a front side, a rear side or a lateral side of the vehicle body. Consequently, in the output image, a difference between the position of the object in the upper-and-lower direction and the position of the protruding portion in the upper-and-lower direction is recognized more easily on the basis of the second marking image, for example.

In addition, the above-described image processing apparatus for a vehicle includes, for example, a variably-setting portion configured to change the virtual projection surface. The variably-setting portion may change the virtual projection surface in accordance with a circumstance of the vehicle. Consequently, in the output image, a more convenient display mode which is according to a circumstance of the vehicle is easily obtained, for example. The circumstance of the vehicle includes, for example, a speed of the vehicle, an inclination of the vehicle and a distance from the vehicle to the object.

In addition, in the above-described image processing apparatus for a vehicle, for example, in a case where a speed of the vehicle is a first speed, the variably-setting portion sets the virtual projection surface where a portion of the virtual projection surface, the portion which corresponds to a distant part from the vehicle, rises steeply. In a case where the speed of the vehicle is a second speed which is lower than the first speed, the variably-setting portion sets the virtual projection surface which rises up gently from a vicinity of the vehicle towards the distant part from the vehicle, or the virtual projection surface where a portion of the virtual projection surface, the portion which corresponds to the vicinity of the vehicle, rises steeply. Consequently, in the output image, a convenient display mode which is in accordance with the speed of the vehicle is easily obtained, for example.

In addition, in the above-described image processing apparatus for a vehicle, for example, the variably-setting portion sets the virtual projection surface of which a corresponding portion rises steeply in accordance with a distance from the vehicle to an object existing in the surroundings. Consequently, in the output image, a convenient display mode which is according to the distance from the vehicle to the object existing in the surroundings is obtained easily, for example.

In addition, in the above-described image processing apparatus for a vehicle, for example, the virtual projection surface includes a reference position positioned at a second height in an upper-and-lower direction of the vehicle, a first projection surface which is closer to the vehicle than the reference position, and a second projection surface which is farther from the vehicle than the reference position and which includes a larger inclination than the first projection surface. The image processing apparatus for a vehicle includes a projection object setting portion setting a projection object to be projected onto the second projection surface from among objects existing in the surroundings of the vehicle. The image processing apparatus for a vehicle includes a distance detection portion detecting a second distance from the vehicle to the projection object. The variably-setting portion sets the virtual projection surface such that the larger the second distance is, the farther the reference position becomes away from the vehicle. Consequently, in the output image, the distance and/or the size of the projection object serving as the object to be projected onto the second projection surface is more easily recognized, for example.

In addition, in the above-described image processing apparatus for a vehicle, for example, the variably-setting portion sets the virtual projection surface such that the reference position is closer to the vehicle than the projection object. Consequently, in the output image, an image of the projection object is restricted from being indicated in a state of bridging across the first projection surface and the second projection surface over the reference position in a state where the image of the projection object is indicated with a large distortion or deformation, for example.

MODE FOR CARRYING OUT THE INVENTION

An exemplary embodiment of the present invention and variations thereof will be disclosed below. The configurations of the embodiment and the variations, and operations, results and effects which are obtained by the configurations, as are described below, are examples. The present invention can be implemented with a configuration other than the configurations disclosed in the embodiment and the variations which are disclosed below. In addition, according to the present invention, at least one of the various effects and/or derivative effects which are obtained from the configurations may be obtained.

In addition, the embodiment and the examples that will be disclosed below include similar constituent features or structural members to each other. The similar constituent features or structural members will be given common numerical references and duplicated explanations will be omitted.

Figure 1:
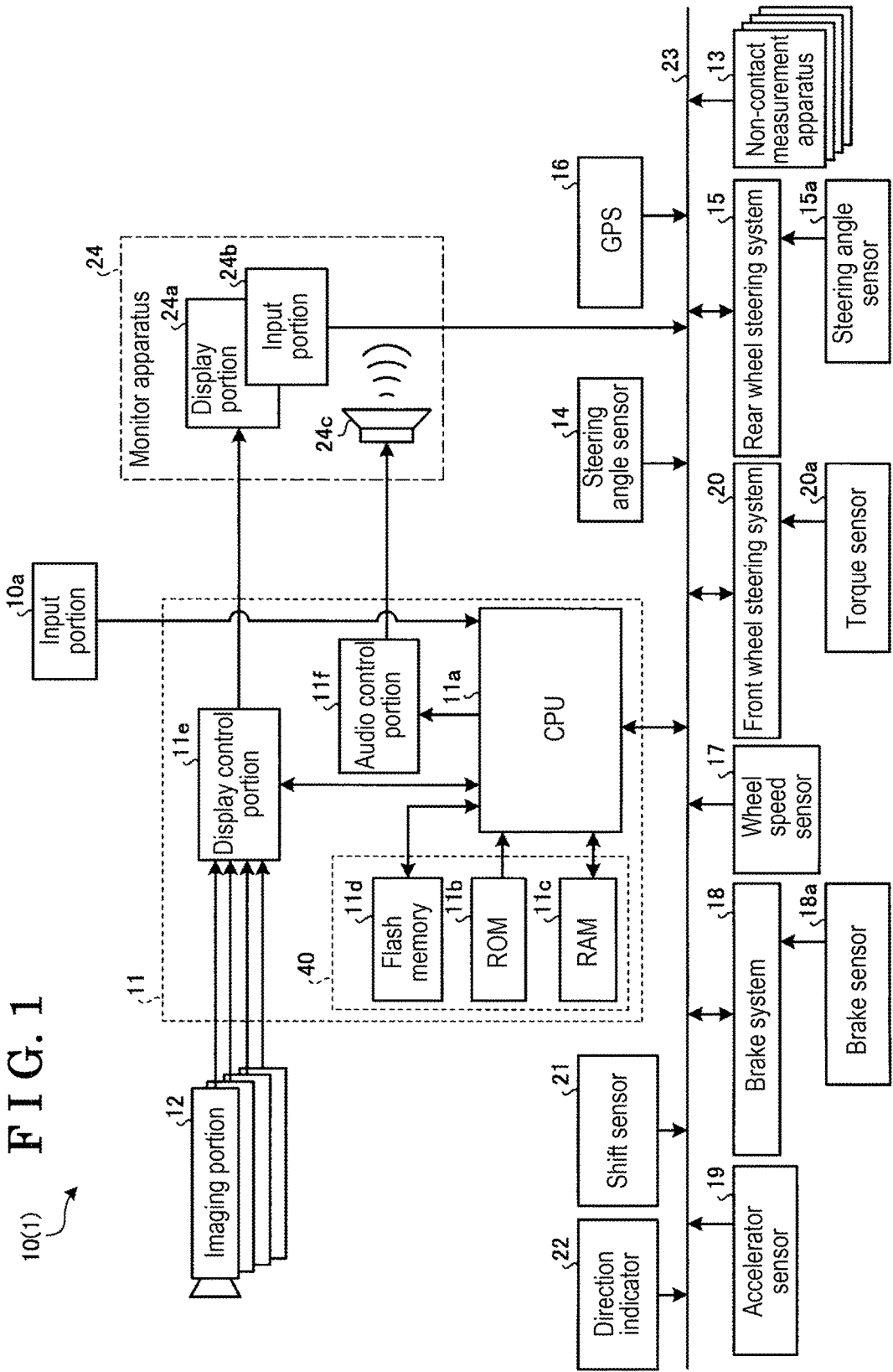
FIG. 1 is an exemplary schematic view of the configuration of an image display system according to an embodiment.

FIG. 1 is an exemplary schematic configuration view of an image display system. As illustrated in FIG. 1, an image display system 10 provided at a vehicle 1 includes an ECU 11 (an electronic control unit). The ECU 11 performs image processing on a captured image taken by an imaging portion 12, and generates an output image. The ECU 11 controls a display portion 24a such that the output image is displayed. The ECU 11 is an example of an image processing apparatus or a display control portion.

(Overview of the output image) An overview of an output image Io generated by the image display system 10 of the present embodiment will be explained with reference to FIGS. 2 and 3. In the output image Io in each of FIGS. 2 and 3, an image of an object existing in surroundings of the vehicle 1 is not included. In addition, the gridlines are provided in FIGS. 2 and 3 for an explanatory purpose, and may not be included in the actual output image Io.

Figure 2:
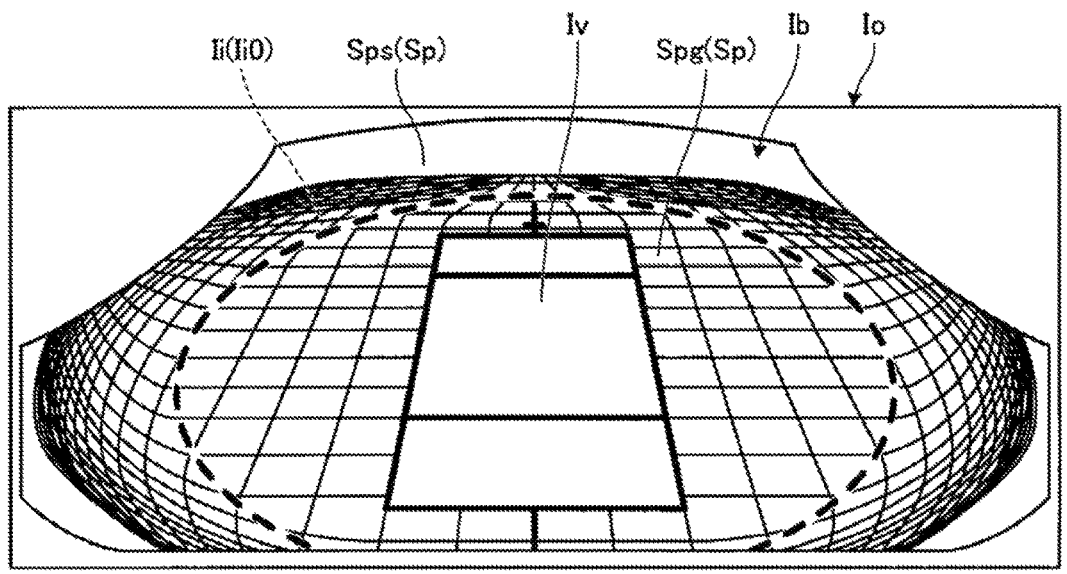
FIG. 2 is a view illustrating an example of an output image by the image display system of the embodiment.

FIG. 2 is a view illustrating an example of the output image Io by the image display system 10. As illustrated in FIG. 2, the output image Io serving as an image displayed at the display portion 24a includes a vehicle body image Iv, a viewpoint image Ib and a marking image Ii.

The vehicle body image Iv indicates a vehicle body 2, in other words, the vehicle 1, that is, as an own vehicle. The vehicle body image Iv is, in advance, prepared, is stored, and is inserted in a predetermined region in the output image Io, but the vehicle body image Iv is not an image taken by the imaging portion 12 which is illustrated in FIG. 1 and is provided at the vehicle body 2. As the vehicle body image Iv, a viewpoint image from a view point which is same as the viewpoint image Ib or which is close to the viewpoint image Ib is used, for example.

The viewpoint image Ib is generated on the basis of the captured image obtained at the imaging portion 12 shown in FIG. 1 and provided at the vehicle body 2. The viewpoint image Ib is an image where a virtual projection surface on which the captured image is projected is seen from a virtual viewpoint. For example, the viewpoint image Ib is an image with which a virtual projection conversion and/or a viewpoint conversion have been performed. In the present embodiment, the viewpoint image Ib is a bird's-eye view image in which surroundings of the vehicle body 2 are seen from an obliquely upper side, for example. The ECU 11 obtains data of the viewpoint image Ib via image processing including a coordinate conversion and/or a projection conversion which are performed relative to data of the captured image taken by the imaging portion 12. The viewpoint image Ib may be a video image or a moving image which is updated substantially on a real-time basis or may be a still image. The viewpoint image Ib will be explained in more detail below.

The marking image Ii is an additional or auxiliary image indicating a specific position in the viewpoint image Ib. In the example illustrated in FIG. 2, the marking image Ii is the image including the line, for example, the broken line, forming the elliptic or oval shape. The marking image Ii indicates a position which is away from a center (the gravity center) of the vehicle body 2 by a predetermined distance (2 meters, for example) and is at a height same as the ground surface. That is, the marking image Ii indicates a position at which a height is equal to 0 (Height=0) in an upper-and-lower direction of the vehicle. For example, the position and/or the shape of the marking image Ii are determined according to a configuration of the virtual projection surface of the viewpoint image Ib and/or a position of the view point in order to indicate the specific position on the virtual projection surface of the viewpoint image Ib. The marking image Ii will be explained in more detail below.

Figure 3:
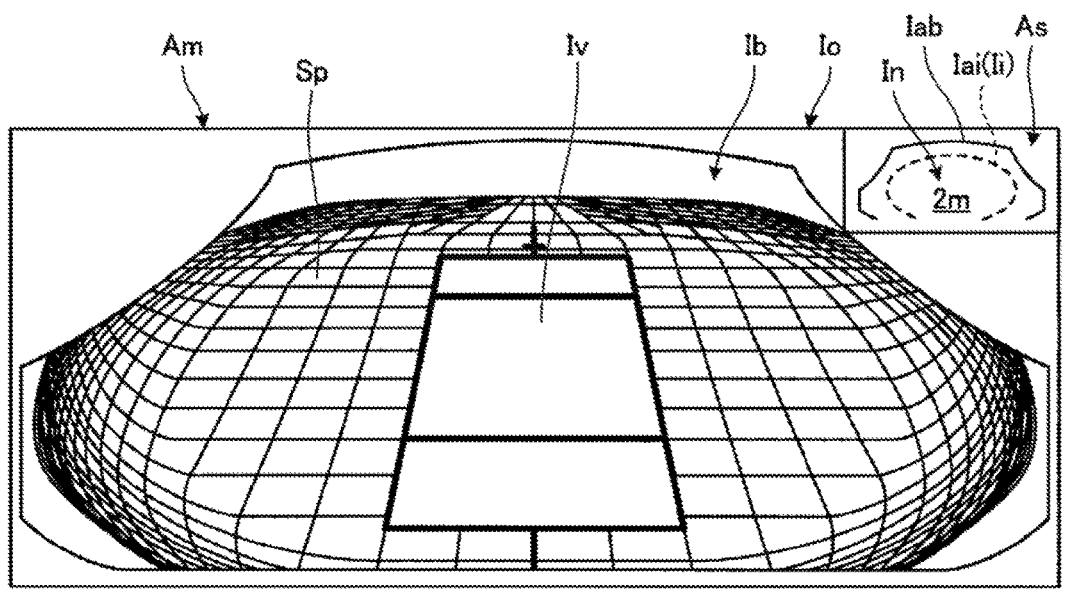
FIG. 3 is a view illustrating another example of the output image by the image display system of the embodiment.

FIG. 3 is a view illustrating another example of the output image Io by the image display system 10, which differs from FIG. 2. In the example illustrated in FIG. 3, the marking image Ii is not included in a main display region Am in which the viewpoint image Ib is displayed, but the marking image Ii is included in a sub window As which is different from the main display region Am and is smaller than the main display region Am. In the sub window As, a schematic image Iab of the viewpoint image Ib and a schematic image Iai of the marking image Ii are overlapped with each other. In the example, in the sub window As, the arrangement and/or size of the marking image Ii in the viewpoint image Ib at, for example, the position at which the Height=0 in the upper-and-lower direction of the vehicle, is indicated. The sub window As is referred to also as a sub display region. In the sub window As, also a numerical number In indicating a radius of a position corresponding to the marking image Ii from the center (the gravity center) of the vehicle body 2 is indicated.

(Image display system) Next, the image display system 10 generating the output image Io illustrated in FIGS. 2 and 3 will be described. The image display system 10 may display the output image Io in accordance with circumstances of the vehicle 1. The image display system 10 may be incorporated or included in a system in which the output image Io is used to control the vehicle 1, such system including a drive assist system and/or a park assist system, for example.

As illustrated in FIG. 1, apparatuses and/or electric components which are included in the image display system 10 are electrically or communicably connected to each other via, for example, an in-vehicle network 23. The apparatuses and/or electric components include a non-contact measurement apparatus 13, a steering angle sensor 14, a steering angle sensor 15a, a GPS 16, a wheel speed sensor 17, a brake sensor 18a, an accelerator sensor 19, a torque sensor 20a, a shift sensor 21, a direction indicator 22 and/or an input portion 24b, for example. The in-vehicle network 23 is CAN (a controller area network), for example. The electric components may be electrically or communicably connected to each other via other than the CAN.

The imaging portion 12 is a digital camera including a built-in imaging element such as CCD (a charge coupled device) and/or CIS (a CMOS image sensor), for example. The imaging portion 12 may output image data, that is, video image data or moving image data, at a predetermined frame rate.

Figure 4:
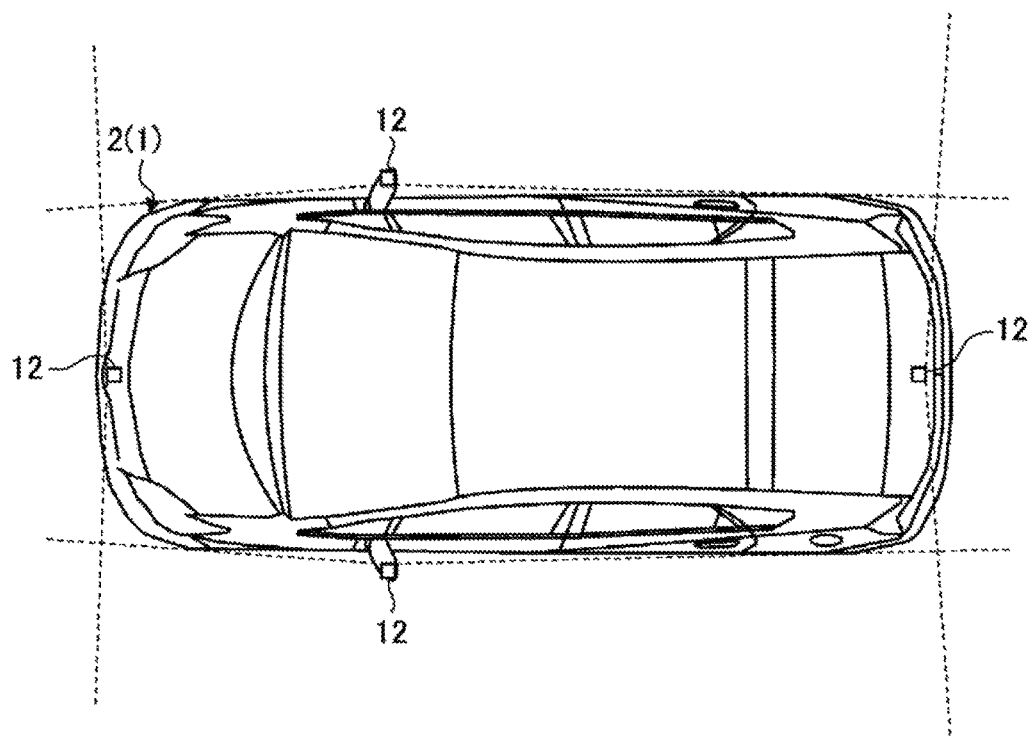
FIG. 4 is a plane view illustrating an example of an imaging range of an imaging portion of the image display system of the embodiment.

FIG. 4 is a plane view illustrating an example of an imaging range of the imaging portion 12. As exemplarily illustrated in FIG. 4, the vehicle body 2 is provided with the imaging portions 12 taking images of the outside of the vehicle, which are provided at a front portion, a right side portion, a left side portion and a rear portion of the vehicle body 2 respectively. The imaging portion 12 provided at the front portion of the vehicle body 2 is attached to a radiator grill, for example. The imaging portions 12 provided at the right and left side portions of the vehicle body 2 are attached to door mirrors, respectively, for example. The imaging portion 12 provided at the rear portion of the vehicle body 2 is attached to a rear hatch door, for example. For example, the imaging portions 12 may be provided at right and left corners of a rear end portion of the vehicle body 2, respectively, which are not shown. The imaging portion 12 is a wide angle lens or a fisheye lens, for example. The imaging portion 12 obtains data of the captured image of the surroundings of the vehicle body 2 (the vehicle 1). Three or less imaging portions 12, or five or more imaging portions 12 may be provided. The imaging ranges of the respective imaging portions 12 may differ from each other.

For example, the non-contact measurement apparatus 13 is sonar and/or a radar which emits supersonic waves and/or electric waves, and catches the reflected waves. The ECU 11 may measure presence or absence of an obstacle positioned in a periphery of the vehicle 1, and/or a distance to the obstacle, on the basis of a detection result of the non-contact measurement apparatus 13. That is, the non-contact measurement apparatus 13 is referred to also as an object detection portion and/or a distance measuring portion.

The steering angle sensor 14 is a sensor detecting a steering amount of a steering wheel which serves as a steering portion and is not shown. The steering angle sensor 14 is formed by Hall element, for example. The steering angle sensor 15a is a sensor detecting a steering amount of a rear wheel. The steering angle sensor 15a is formed by Hall element, for example. The steering amount is detected as an angle of rotation, for example.

The GPS 16 (the global positioning system) may acquire the current position on the basis of radio waves received from satellite.

The wheel speed sensor 17 is a sensor detecting an amount of rotation of the wheel and/or the number of rotations per unit time of the wheel. The wheel speed sensor 17 is formed by Hall element, for example. The ECU 11 is configured to calculate, for example, an amount of movement of the vehicle 1 on the basis of data obtained from the wheel speed sensor 17. The wheel speed sensor 17 may be provided at a brake system 18.

For example, the brake system 18 is ABS (an anti-lock brake system) which restricts locking of the braking, an antiskid system (ESC: an electronic stability control) which restricts the vehicle 1 from skidding at cornering, and/or an electric brake system which intensifies a braking force, BBW (a brake by wire). The brake system 18 applies a braking force to the wheels via an actuator that is not shown, and decelerates the vehicle 1. The brake sensor 18a is a sensor detecting an operation amount of the brake pedal, for example.

The accelerator sensor 19 is a sensor detecting an operation amount of an accelerator pedal. The torque sensor 20a detects torque applied to the steering portion by a driver. For example, the shift sensor 21 is a sensor detecting a position of a movable portion of a shift operation portion and is configured with the use of a displacement sensor, for example. The movable portion is a lever, an arm and/or a button, for example. The configurations, the arrangements, the electrical connection modes and so forth of the sensors and/or actuators which are described above are examples, and may be set or changed in various ways. The direction indicator 22 outputs signals instructing lighting on, lighting off and flashing of the directional light, for example.

The image display system 10 may include an input portion 10a. In this case, the input portion 10a is configured as a push button, a switch, a tab or the like, for example.

A monitor apparatus 24 includes the display portion 24a, the input portion 24b and an audio output apparatus 24c. The display portion 24a is an LCD (a liquid crystal display), for example. The audio output apparatus 24c is a loudspeaker, for example. The input portion 24b is transparent and covers the display portion 24a. The input portion 24b is a touch panel or touch screen, for example. A user can visually recognize an image displayed on a display screen of the display portion 24a via the input portion 24b. The user can perform input by operating the input portion 24b, for example, by touching, pushing or moving with his/her finger, at a position corresponding to the image displayed on the display screen of the display portion 24a, for example. For example, the display portion 24a, the input portion 24b and/or the audio output apparatus 24c are provided at the monitor apparatus 24 arranged at a central portion of a dashboard in a vehicle width direction, that is, in a right and left direction. The monitor apparatus 24 may include an input portion that is not shown, including a switch, a dial, a joystick and/or a push button, for example. The monitor apparatus 24 is used also for a navigation system and/or an audio system.

The ECU 11 includes a CPU 11a (a central processing unit), ROM 11b (read only memory), RAM 11c (random access memory), a flash memory 11d, a display control portion 11e, an audio control portion 11f, for example. The flash memory 11d may be SSD (a solid state drive). The CPU 11a may perform various calculations. The CPU 11a may read out program installed and stored in a non-volatile storage device including the ROM 11b and/or the flash memory 11d, and may perform arithmetic processing in accordance with the program. The RAM 11c temporarily stores various data used in the calculations performed at the CPU 11a. The flash memory 11d is a rewritable non-volatile storage portion and may store data even in a case where power of the ECU 11 is turned off. For example, the display control portion 11e may mainly perform general image processing using the image data obtained at the imaging portion 12 and/or general image processing of image data to be displayed at the display portion 24a. The audio control portion 11f may mainly perform processing of audio data outputted at the audio output apparatus 24c. For example, the CPU 11a, the ROM 11b and/or the RAM 11c may be integrated in one same package. For example, the ECU 11 may be configured to use other logical operation processor and/or logic circuit, including a DSP (a digital signal processor), instead of the CPU 11a. Instead of the flash memory 11d, HDD (a hard disk drive) may be provided. The flash memory 11d and/or the HDD may be provided separately from the ECU 11.

Figure 5:
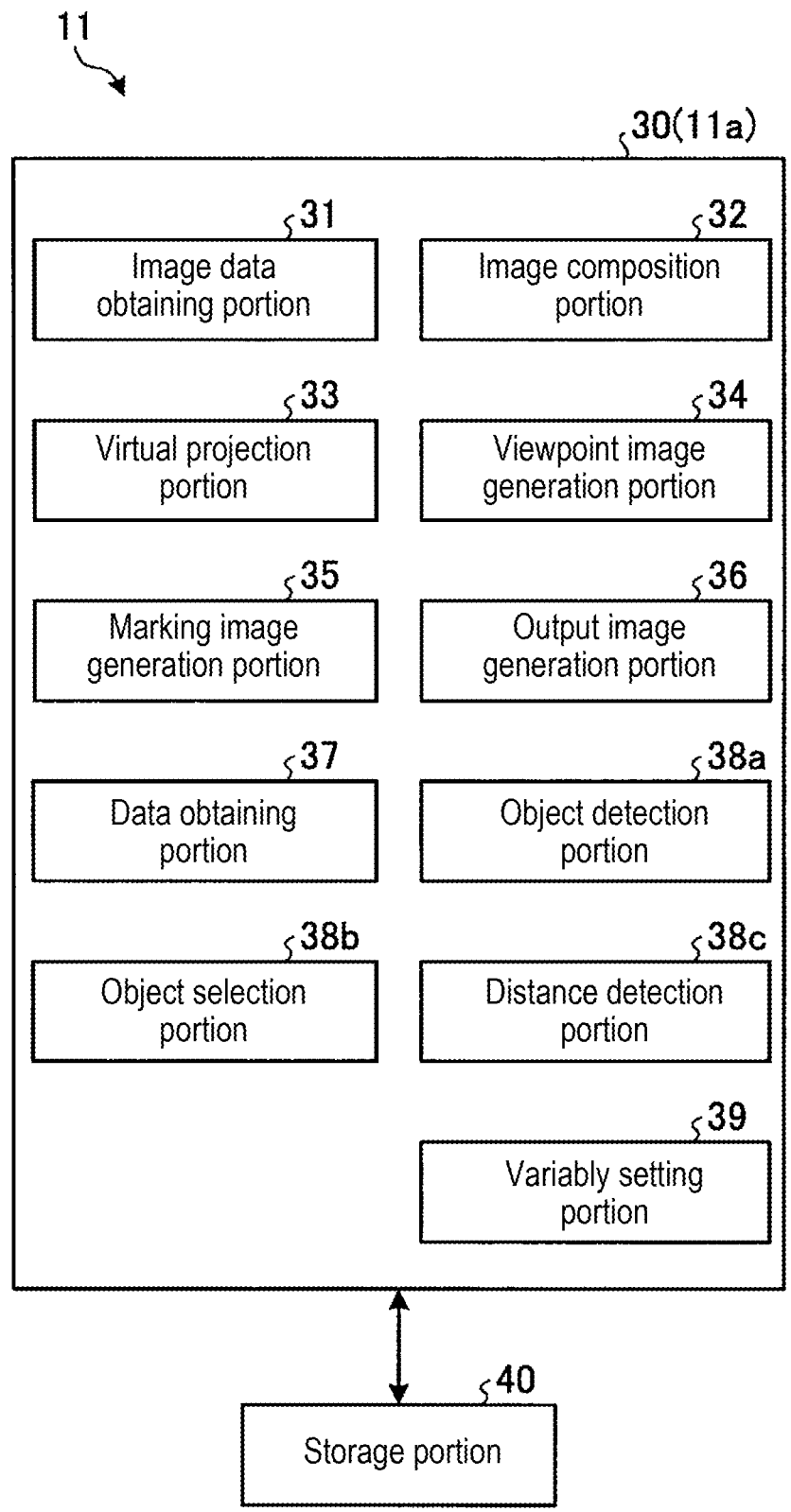
FIG. 5 is an exemplary and schematic block diagram of an image processing apparatus included in the image display system of the embodiment.

FIG. 5 is an exemplary and schematic block diagram of the ECU 11. The ECU 11 may function as the image processing apparatus in which the hardware and the software (the program) cooperate with each other. The ECU 11 may include the display control portion 11e and/or the audio control portion 11f as illustrated in FIG. 1, and the ECU 11 may also include an image processing portion 30 and a storage portion 40 as illustrated in FIG. 5. The image processing portion 30 is configured by the CPU 11a, for example. In this case, the CPU 11a functions as various portions of the image processing portion 30, the various portions which include an image data obtaining portion 31, an image composition portion 32, a virtual projection portion 33, a viewpoint image generation portion 34, a marking image generation portion 35, an output image generation portion 36, a data obtaining portion 37, an object detection portion 38a, an object selection portion 38b, a distance detection portion 38c and a variably-setting portion 39, for example. The storage portion 40 includes the ROM 11b, the RA 11c and the flash memory 11d. At least part of the image processing performed at the image processing portion 30 may be performed at the display control portion 11e. Each of the portions of the image processing portion 30 may correspond to a module of the program and/or at least part of the image processing portion 30 may be configured as the hardware.

The image data obtaining portion 31 obtains data of plural captured images taken by the plural imaging portions 12.

The image composition portion 32 connects or joins the data of the plural captured images obtained at the image data obtaining portion 31, that is, the data of the plural captured images taken by the plural imaging portion 12, to each other by composing boundary portions of the plural captured images, and thus, the image composition portion 32 generates data of one captured image.

Figure 6:
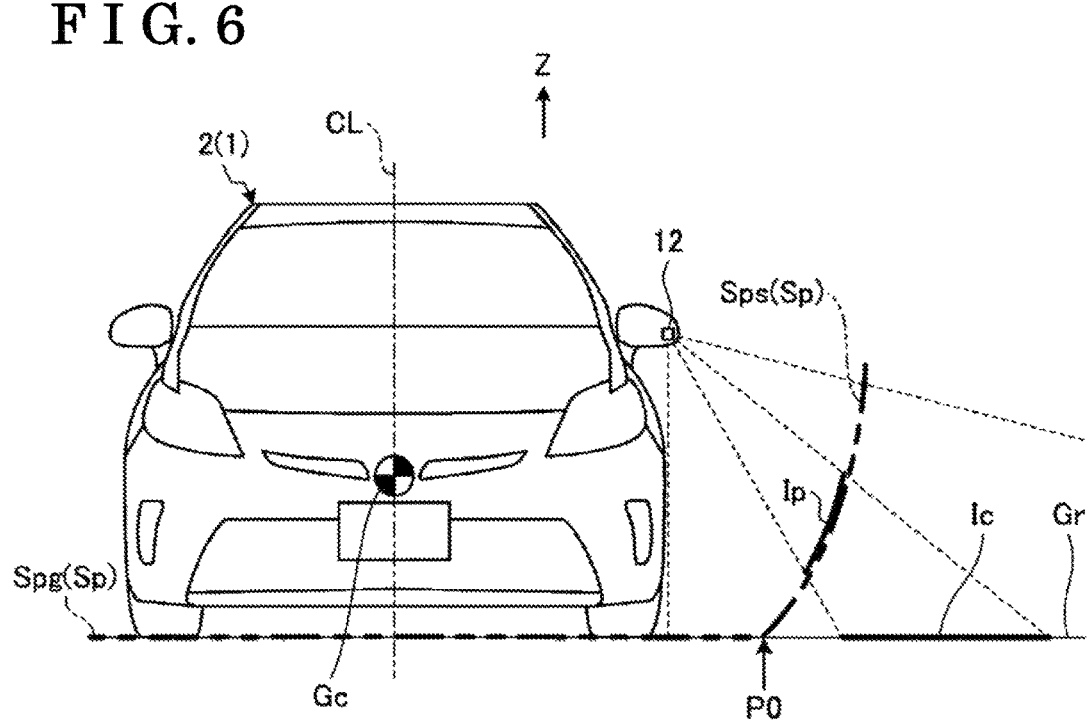
FIG. 6 is an exemplary and schematic explanatory view illustrating projection of a captured image onto a virtual projection surface of the image display system of the embodiment.

The virtual projection portion 33 generates data of a virtual projected image in which the data of the captured image is projected onto the virtual projection surface surrounding the periphery of the vehicle 1. FIG. 6 is an exemplary and schematic explanatory view illustrating the projection of a captured image Ic onto a virtual projection surface Sp in the image display system 10. In the example of FIG. 6, the virtual projection surface Sp includes a bottom surface Spg which is arranged along a ground surface Gr, and a side surface Sps which rises or stands from the bottom surface Spg, that is, from the ground surface Gr. The ground surface Gr is a horizontal plane which is orthogonal to the upper-and-lower direction Z of the vehicle 1 and the ground surface Gr is also a ground contact surface of a tire. The bottom surface Spg is a flat surface including a substantially circular shape, and is a horizontal plane with respect to the vehicle 1. The side surface Sps is a curved surface which is in contact with the bottom surface Spg. As illustrated in FIG. 6, a virtual cross section of the side surface Sps, the virtual cross section which passes through a center Gc of the vehicle 1 and is perpendicular to a front-back direction of the vehicle, includes an oval shape or parabolic curve, for example. For example, the side surface Sps is formed as a surface of revolution about a central line CL which passes through the center Gc of the vehicle 1 and is along the upper-and-lower direction of the vehicle 1, and the side surface Sps surrounds the surroundings or the periphery of the vehicle 1. The virtual projection portion 33 calculates a virtual projected image Ip where the captured image Ic is projected onto the virtual projection surface Sp. In a case where the captured image Ic is projected onto the ground surface Gr, the image becomes longer as being more distant away from the imaging portion 12, and accordingly the captured image Ic may be reflected to be longer than an actual length in the output image. As can be seen from FIG. 6, the virtual projected image Ip projected onto the side surface Sps rising up from the ground surface Gr (the bottom surface Spg) includes a shorter image compared to a case in which the image is projected onto the ground surface Gr. Thus, in the output image, it is restricted that the reflected virtual projected image Ip includes the length that is longer than the actual length. The bottom surface Spg is an example of a first projection surface, and the side surface Sps is an example of a second projection surface including an inclination which is larger than an inclination of the first projection surface.

Figure 7:
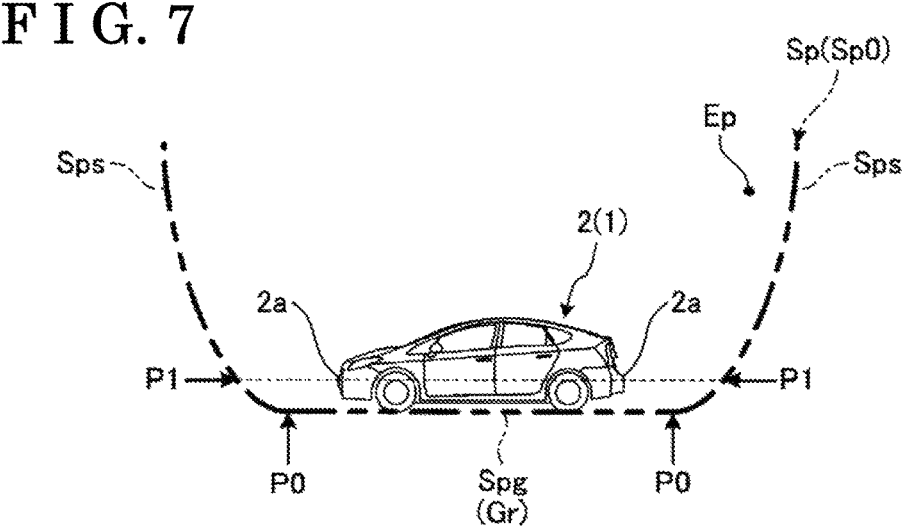
FIG. 7 is an exemplary and schematic side view illustrating a vehicle, and the virtual projection surface of the image display system of the embodiment.

The viewpoint image generation portion 34 generates the viewpoint image Ib in which the virtual projected image Ip projected onto the virtual projection surface Sp is viewed from a predetermined virtual viewpoint. FIG. 7 is an exemplary and schematic side view illustrating the vehicle 1, and the virtual projection surface Sp (Sp0) of the image display system 10. As illustrated in FIG. 7, the viewpoint image generation portion 34 converts the virtual projected image Ip (not shown in FIG. 7) projected onto the virtual projection surface Sp into the viewpoint image Ib (not shown in FIG. 7) where an obliquely lower side is viewed from a predetermined viewpoint Ep. The predetermined viewpoint Ep is set at a rear upper side relative to the vehicle 1. Accordingly, the viewpoint image Ib, as included in the output image Io illustrated in FIGS. 2 and 3, is obtained.

The marking image generation portion 35 generates the marking image Ii indicating a predetermined position in the virtual projection surface Sp. The marking image Ii (Ii0, Iai) illustrated in FIGS. 2 and 3 indicates a portion P0 in the side surface Sps of the virtual projection surface Sp, the portion P0 which is at the same height as the ground surface, that is, the portion P0 at which the height is zero (=0) in the upper-and-lower direction of the vehicle, as illustrated in FIGS. 6 and 7. In a case where the bottom surface Spg of the virtual projection surface Sp is a flat plane including the same height as the ground surface Gr, the portion P0 corresponds to a boundary between the bottom surface Spg (the ground surface Gr) and the side surface Sps. As an example of the present embodiment, a rate of change, the change which is made to an image of an object by the projection conversion and/or the viewpoint conversion, changes on a side of the bottom surface Spg and a side of the side surface Sps with respect to the portion P0 serving as the boundary. Thus, due to the marking image Ii (Ii0) included in the output image Io, the user can recognize the position at which a length and/or a shape of the image of the object changes in the output image Io. The marking image Ii (Ii0) corresponding to the portion P0 is an example of a first marking image. The height of the portion P0 (Height=0) is an example of a first height and also is an example of a second height. In addition, the portion P0 is an example of a reference position in a variable setting of the virtual projection surface Sp, which will be described below.

Figure 8:
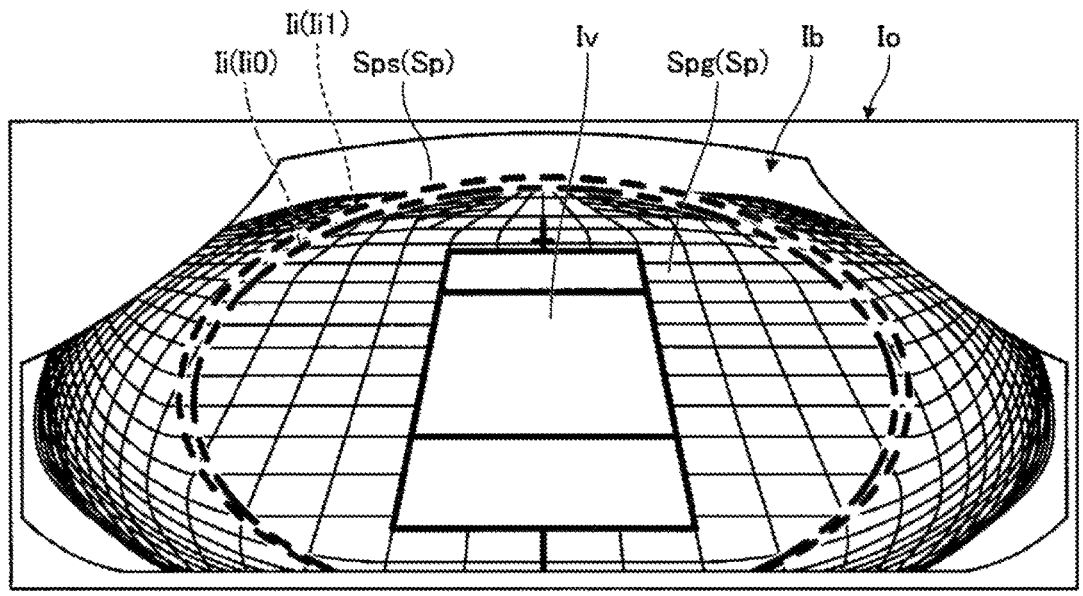
FIG. 8 is a view illustrating another example of the output image by the image display system of the embodiment.

FIG. 8 is a view illustrating another example of the output image Io by the image display system 10. In a similar manner to the marking image Ii (Ii0) illustrated in FIGS. 2 and 3, the marking image Ii (Ii0) illustrated in FIG. 8 corresponds to the portion P0. The marking image Ii (Ii1) which is another marking image different from the marking image Ii (Ii0) indicates a portion P1 of FIG. 7. That is, the portion P1 is at the same height as a protruding portion 2a (a projected portion) protruding at the vehicle body 2 (the vehicle 1) towards a front side, a rear side or a lateral side. The protruding portion 2a forms an end portion of the vehicle body 2 at the front side, the rear side or the lateral side, and corresponds to a bumper, for example. Thus, due to the marking image Ii (Ii1) indicating the portion P1 at the same height as the protruding portion 2a, the user can recognize an object in the viewpoint image Ib which is at the same height as the protruding portion 2a, for example. The marking image Ii (Ii1) corresponding to the portion P1 is an example of a second marking image. In a case where the two marking images Ii0 and Ii1 are included, the user can more easily recognize, in the viewpoint image Ib, a height of an object which overlaps with the marking images Ii0 and Ii1 or which is close to the marking images Ii0 and Ii1. In the output image Io, specifications of the plural marking images Ii may differ from each other, the specifications which including colors, thicknesses and types of lines, for example. The output image Io may include only the marking image Ii (Ii1) indicating the portion P1.

The data obtaining portion 37 obtains data other than the captured image. Such date includes data inputted by the input portions 24b, 10a and/or data of detection results of sensors, for example.

The object detection portion 38a detects an object existing in the periphery of the vehicle body 2 (the vehicle 1) on the basis of a detection result by the non-contact measurement apparatus 13 including the sonar and/or the radar, and/or a imaging result by the imaging portion 12 (for example, a stereo camera). The object detection portion 38a may detect the object on the basis of a detection result from a detection apparatus other than the above-described apparatuses and/or on the basis of detection results of plural detection apparatuses. The object detection portion 38a may detect an object meeting a predetermined condition. Such an object includes, for example, an object of which a size is larger than a predetermined size, an object of which a height is higher than a predetermined height, an object of which a width is larger than a predetermined width and an object existing within a predetermined range (for example, a distance range and/or a height range).

The object selection portion 38b may select an object which meets a preset condition, out of the objects detected by the object detection portion 38a. The object selection portion 38b may select an object which meets a predetermined condition, for example, an object of which a size is larger than a predetermined size, an object of which a height is higher than a predetermined height, an object of which a width is larger than a predetermined width and an object existing within a predetermined range (for example, a distance range and/or a height range). In this case, the conditions differ from the conditions at the object detection portion 38a. The object selection portion 38b may select an object meeting the preset condition as the object to be projected onto the side surface Sps. In this case, the object is an example of a projection object, and the object selection portion 38b is an example of a projection object setting portion.

The distance detection portion 38c obtains a distance (a first distance and a second distance) from a reference point of the vehicle body 2 (the vehicle 1) to each of the objects detected by the object detection portion 38a and/or to each of the objects selected by the object selection portion 38b. The distance detection portion 38c may obtain the distance on the basis of the detection result by the non-contact measurement apparatus 13 including the solar and/or the radar, and/or on the basis of the imaging result by one or more of the imaging portions 12, for example. In a case where plural distances are detected by the non-contact measurement apparatus 13 with respect to the object which is regarded as one object, the distance detection portion 38c may calculate a representative value (for example, the minimum value, the average value and/or the median value, in a predetermined range) of the plural distances, the representative value which serves as the distance from the reference point to the object.

Figure 9:
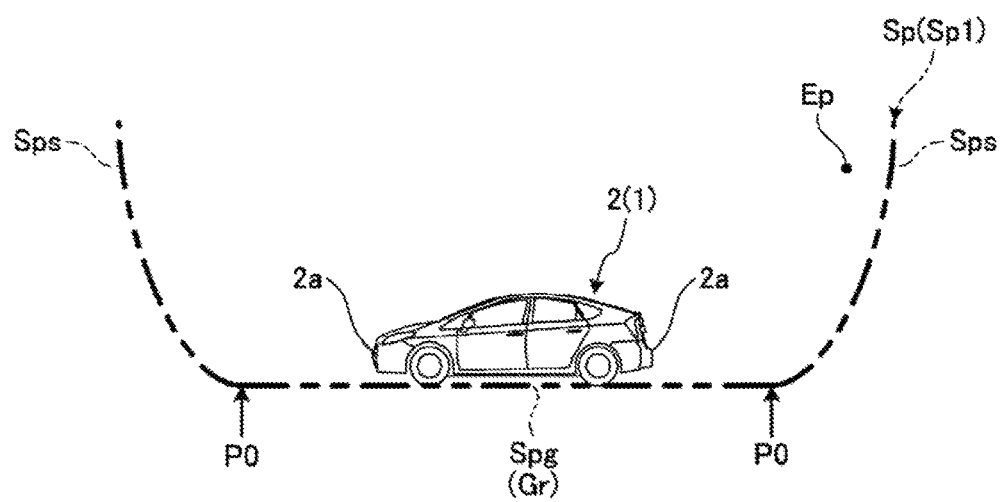
FIG. 9 is an exemplary and schematic side view illustrating the vehicle, and the virtual projection surface of the image display system of the embodiment, which is different from FIG. 7.
Figure 10:
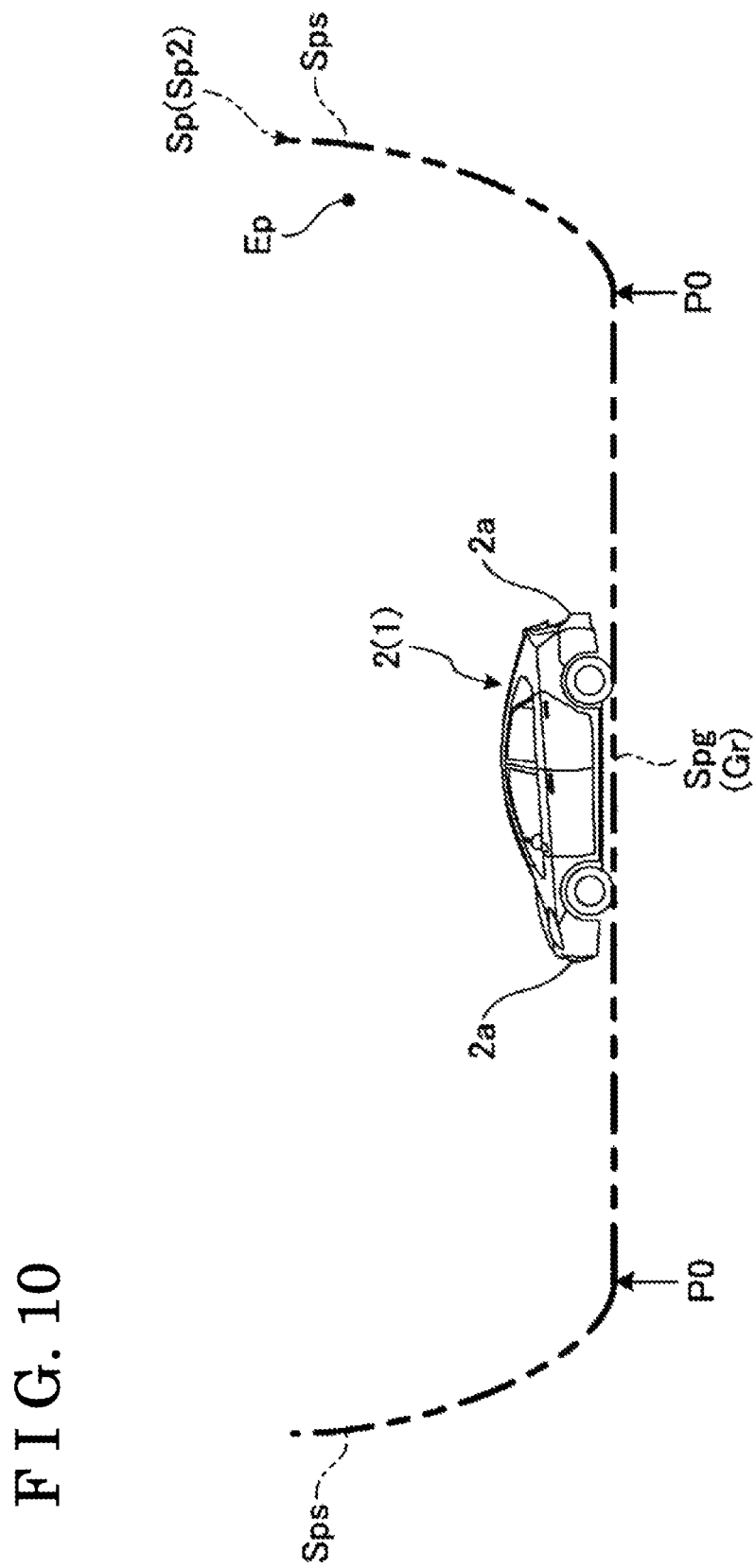
FIG. 10 is an exemplary and schematic side view illustrating the vehicle, and the virtual projection surface of the image display system of the embodiment, which is different from FIGS. 7 and 8.

The variably-setting portion 39 may change the virtual projection surface Sp. FIG. 9 is an exemplary and schematic side view illustrating the vehicle 1, and the virtual projection surface Sp (Sp1) of the image display system 10, the virtual projection surface Sp (Sp1) which is different from FIG. 7. FIG. 10 is an exemplary and schematic side view illustrating the vehicle 1, and the virtual projection surface Sp (Sp2) of the image display system 10, the virtual projection surface Sp (Sp2) which is different from FIGS. 7 and 8. As is clear from a comparison among FIGS. 7, 9 and 10, in the virtual projection surfaces Sp0, Sp1 and Sp2, largeness (sizes) of the respective bottom surfaces Spg, that is, distances from the vehicle body 2 (the vehicle 1) to the respective side surfaces Sps (the portion P0), differ from one another. The variably-setting portion 39 may change the virtual projection surface Sp by reading any of data of the plural virtual projection surfaces Sp which are stored in the storage portion 40 and/or by performing a calculation in accordance with a mathematical expression.

The projection of the virtual projected image Ip onto the side surface Sps rising from the ground surface Gr (the bottom surface Spg) is more effective for the object which is relatively close to the side surface Sps. In the present embodiment, the variably-setting portion 39 changes the virtual projection surface Sp according to circumstances of the vehicle 1 and/or preference of the user, and thus the position of the side surface Sps may be changed. That is, the variably-setting portion 39 may change a position at which the effect due to the side surface Sps of the virtual projection surface Sp is obtained.

The change of the virtual projection surface Sp by the variably-setting portion 39 is performed on the basis of data inputted by the user via the operation of the input portions 24b, 10a. Thus, the virtual projection surface Sp selected depending on the preference of the user is set. The virtual projection portion 33 and the viewpoint image generation portion 34 perform predetermined calculations with regard to the virtual projection surface Sp set by the variably-setting portion 39.

The variably-setting portion 39 may change the virtual projection surface Sp in response to speed of the vehicle 1. For example, on the basis of a detection result of the wheel speed sensor 17, in a state where a speed V of the vehicle 1 is equal to or smaller than a first threshold value Vth1 (V≤Vth1) the variably-setting portion 39 sets the virtual projection surface Sp0 in which the bottom surface Spg is narrow (small) as illustrated in the example of FIG. 7. In a state where (Vth1<V≤Vth2) the speed V of the vehicle 1 is larger than the first threshold value Vth1 and is equal to or smaller than a second threshold value Vth2 (>Vth1), the variably-setting portion 39 sets the virtual projection surface Sp1 illustrated in the example of FIG. 9 in which the bottom surface Spg is wider (larger) than in the virtual projection surface Sp0 of FIG. 7. In a state where the speed V of the vehicle 1 is larger than the second threshold value Vth2 (V>Vth2), the variably-setting portion 39 sets the virtual projection surface Sp2 illustrated in the example of FIG. 10 in which the bottom surface Spg is wider (larger) than in the virtual projection surface Sp1 of FIG. 9. Alternatively, for example, on the basis of the detection result of the wheel speed sensor 17, the variably-setting portion 39 may set the virtual projection surface Sp such that the higher the speed V is, the larger the bottom surface Spg is, in accordance with a function (a mathematical expression) of the speed V of the vehicle 1 and the largeness of the bottom surface Spg and/or in accordance with a map (a table) indicating a correlative relationship of the speed V and the largeness of the bottom surface Spg. It is often the case that the higher the vehicle V of the vehicle 1 is, the farther from the vehicle 1 a peripheral region in which attention needs to be paid is. It is also often the case that the lower the vehicle V of the vehicle 1 is, the closer to the vehicle 1 the peripheral region in which the attention needs to be paid is. According to the above-described setting, for the peripheral region in which the attention needs to be directed, the effects due to the respective side surfaces Sps of the virtual projection surfaces Sp are obtained. Thus, depending on the distance from the vehicle to the obstacle existing in the periphery, the virtual projection surface Sp may be changed such that the longer the distance is, the larger the bottom surface Spg is. The virtual projection surface Sp0 is an example of the virtual projection surface at which a portion corresponding to a vicinity of the vehicle 1 rises steeply. The virtual projection surface Sp2 is an example of the virtual projection surface at which a portion corresponding to a distant part from the vehicle 1 rises steeply.

The variably-setting portion 39 may change the virtual projection surface Sp depending on not only the speed V of the vehicle 1 but also parameters based on various circumstances. The parameters include a travelling direction of the vehicle 1, an inclination of the vehicle 1, a position of the vehicle 1, a distance from the vehicle 1 to an object existing in the surroundings, a detection result of a sensor and/or a device, a signal and/or data, for example. The sensor and/or device include the non-contact measurement apparatus 13, the steering angle sensors 14, 15a, the GPS 16, the brake sensor 18a, the accelerator sensor 19, the torque sensor 20a, the shift sensor 21 and the direction indicator 22, for example.

Figure 11:
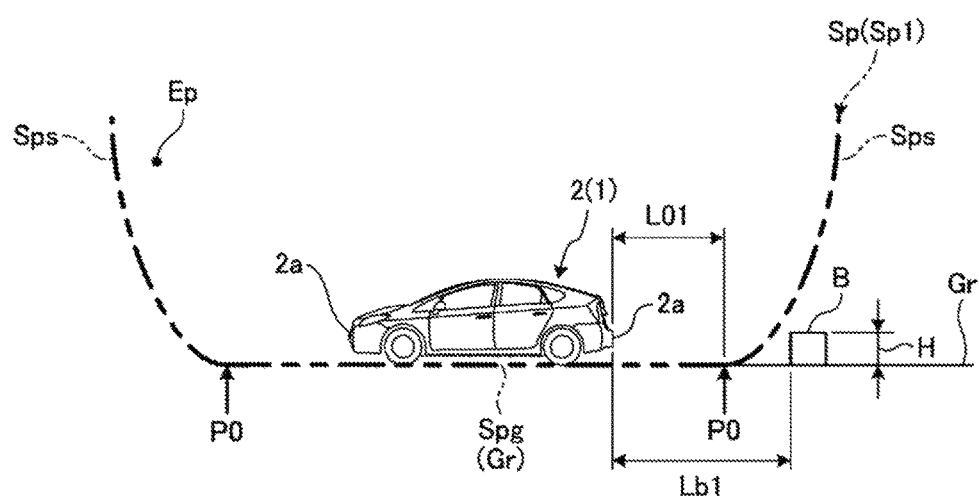
FIG. 11 is an exemplary and schematic side view illustrating the vehicle, an object (a projection object) and the virtual projection surface, according to the image display system of the embodiment.
Figure 12:
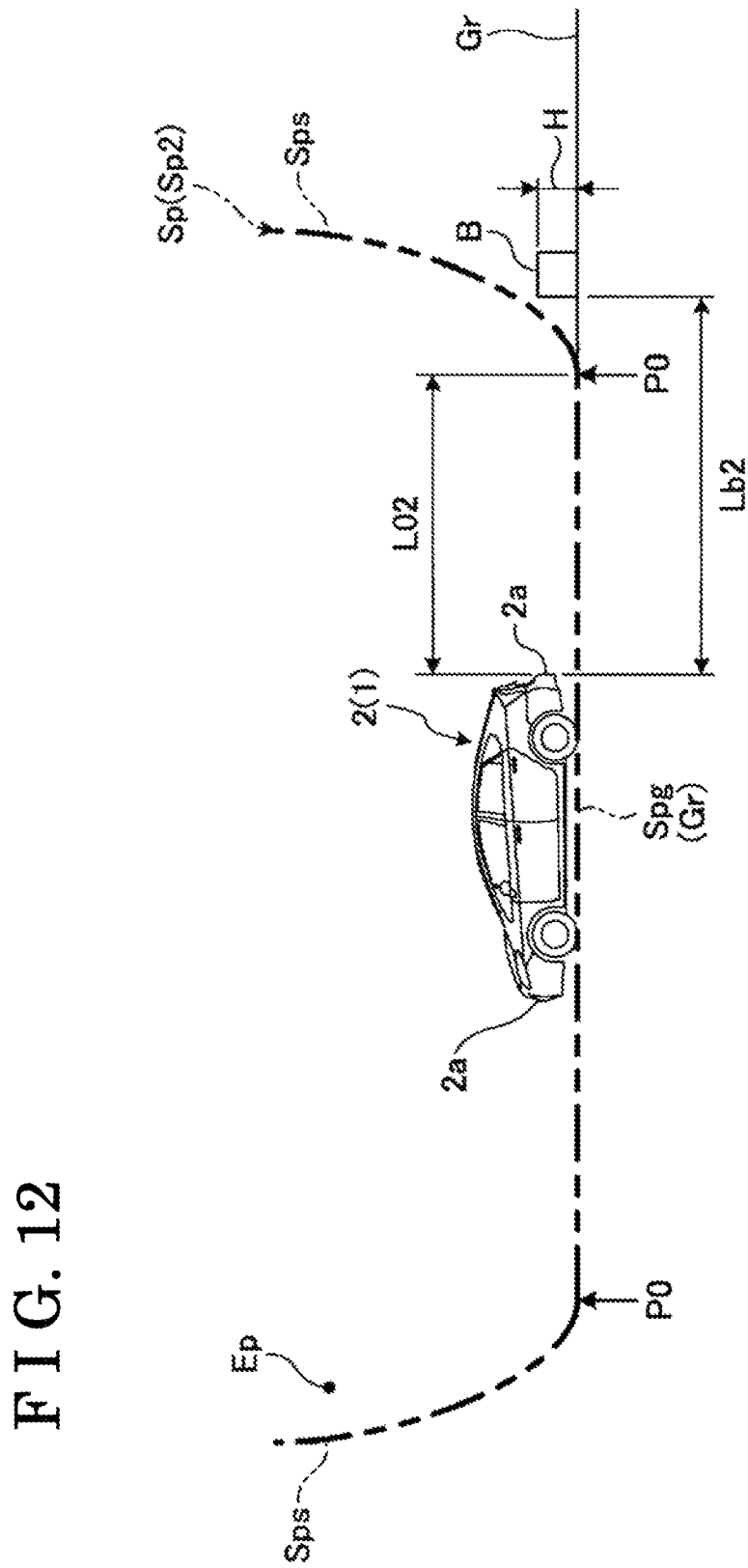
FIG. 12 is an exemplary and schematic side view illustrating the vehicle, the virtual projection surface, and the object (the projection object) which is more distant from the vehicle than in FIG. 11, according to the image display system of the embodiment.

The variably-setting portion 39 may change the virtual projection surface Sp depending on a distance from the vehicle 1 to the projection object which is included in the objects existing in the surroundings of the vehicle 1 and is to be projected onto the virtual projection surface Sp. FIG. 11 is an exemplary and schematic side view illustrating the vehicle 1, a projection object B and the virtual projection surface Sp (Sp1) according to the image display system 10. FIG. 12 is an exemplary and schematic side view illustrating the vehicle 1, the projection object B which is farther from the vehicle 1 than in FIG. 11 and the virtual projection surface Sp (Sp2) according to the image display system 10. Here, the projection object B corresponds to an object which satisfies the preset condition and thus is selected by the object selection portion 38b from among the objects detected by the object detected portion 38a, and the projection object B is an object to be projected at least onto the side surface Sps. In other words, the preset condition is a condition which identifies the object which is to be projected onto the side surface Sps.

As is clear from FIGS. 11 and 12, the variably-setting portion 39 changes the virtual projection surface Sp on the basis of a position of the projection object B, that is, on the basis of distances Lb1, Lb2 (the second distance) from the vehicle 1 to the projection object B. The distance Lb2 from the vehicle 1 to the projection object B in FIG. 12 is longer than the distance Lb1 from the vehicle 1 to the projection object B in FIG. 11. In this case, the variably-setting portion 39 sets a distance L02 from the vehicle 1 to the portion P0 (the reference position) on the virtual projection surface Sp2 of FIG. 12 such that the distance L02 is longer than a distance L01 from the vehicle 1 to the portion P0 on the virtual projection surface Sp1 of FIG. 11. That is, the variably-setting portion 39 sets such that the larger the distance Lb1, Lb2 from the vehicle 1 to the projection obstacle B is, the farther the portion P0 is away from the vehicle 1. Due to the setting described above, for example, the distance and/or a size of the projection object B serving as the object to be projected onto the side surface Sps can be more easily recognized in the output image Io.

The variably-setting portion 39 sets the virtual projection surface Sp such that the portion P0 is closer to the vehicle 1 than the projection object B is. Accordingly, an image of the projection object B is restricted from being indicated to bridge across the side surface Sps and the bottom surface Spg over the portion P0 in the output image Io, in a state where the image of the projection object B is indicated with a large distortion or deformation. The variably-setting portion 39 sets the portion P0 such that the portion P0 is positioned between the vehicle 1 and the projection object B, and the portion P0 is closer to the projection object B than to the vehicle 1. Due to the setting described above, for example, the distance and/or the size of the projection object B can be recognized more easily in the output image Io, compared to a case where the portion P0 is closer to the vehicle 1.

The variably-setting portion 39 may set such that the smaller the distance Lb1, Lb2 from the vehicle 1 to the projection object B is, the smaller the inclination or gradient of the side surface Sps is. The variably-setting portion 39 may set such that the smaller the distance Lb1, Lb2 from the vehicle 1 to the projection object B is, the smaller a change in the inclination of the side surface Sps at the portion P0 is. Due to the settings described above, the distortion of the image of the ground surface Gr at the portion P0 is restricted from becoming large in the output image Io.

For example, the object selection portion 38b may set a third height which is higher than the height (the second height) of the portion P0, and may select an object as the projection object B in a case where a height of the object is equal to or higher than the third height. Also due to the setting described above, the image of the projection object B is restricted from being indicated to bridge across the side surface Sps and the bottom surface Spg over the portion P0 in the output image Io, in the state where the image of the projection object B is indicated with a large distortion or deformation.

Figure 13:
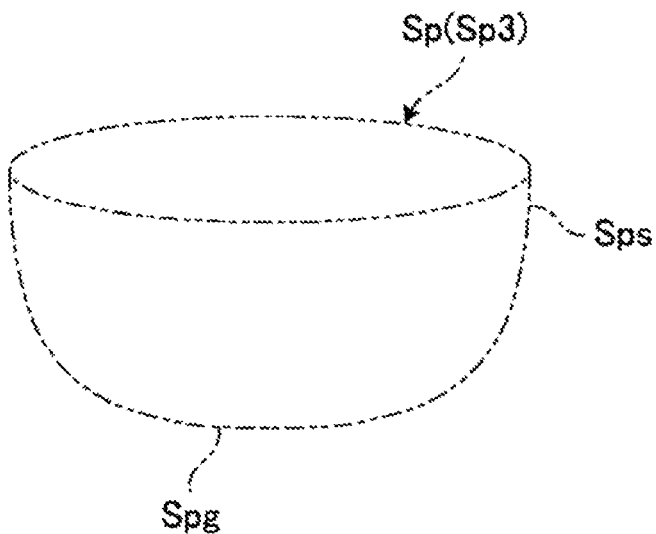
FIG. 13 is a schematic perspective view illustrating another example of the virtual projection surface used in the image display system of the embodiment.

FIG. 13 is an exemplary perspective view illustrating another example of the virtual projection surface Sp used in the image display system 10. The virtual projection surface Sp3 illustrated in the example of FIG. 13 includes a hemispherical shape. As illustrated, the bottom surface Spg of the virtual projection surface Sp may be a curved surface and/or a clear boundary does not need to be provided between the bottom surface Spg of the virtual projection surface Sp and the side surface Sps of the virtual projection surface Sp. In other words, the virtual projection surface Sp of the present embodiment is not limited to a surface which is divided into the bottom surface Spg and the side surface Sps. The virtual projection surface Sp3 is an example of the virtual projection surface rising up gently from the vicinity of the vehicle 1 towards the distant part from the vehicle 1.

Figure 14:
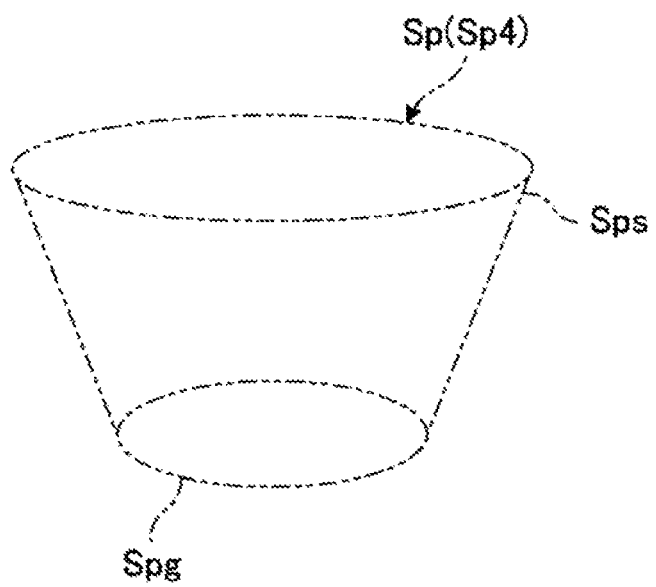
FIG. 14 is a schematic perspective view illustrating another example of the virtual projection surface used in the image display system of the embodiment.

FIG. 14 is an exemplary perspective view illustrating another example of the virtual projection surface Sp used in the image display system 10. The virtual projection surface Sp4 illustrated in FIG. 14 includes a shape of a conical inner surface. As illustrated, the inclination or tilt of the side surface Sps of the virtual projection surface Sp may be constant, and/or the bottom surface Spg of the virtual projection surface Sp and the side surface Sps of the virtual projection surface Sp do not need to be smoothly joined or connected to each other.

In the image display system 10 where the virtual projection surface Sp is changed or varied by the variably-setting portion 39, it is more effective that the marking image Ii is included in the output image Io. For example, due to the marking image Ii included in the output image Io, the user can recognize the changes in the size, the position and the distortion of the image of the object which are caused by the change of the virtual projection surface Sp, and/or the position of the boundary portion between the bottom surface Spg and the side surface Sps at which the shape of the object is easily distorted or deformed, in the output image Io. Consequently, inconvenience cases are restricted in which the user is confused at the change in the screen display and/or in the object in the output image Io, and/or the user incorrectly recognizes the object in the output image Io, for example.

As described above, in the present embodiment, for example, the marking image generation portion 35 generates the marking image Ii indicating the specific position on the virtual projection surface Sp. The output image generation portion 36 generates the output image Io including the viewpoint image Ib and the marking image Ii. Consequently, according to the present embodiment, for example, the position and/or the size of the object is more easily recognized in the output image Io on the basis of the marking image Ii indicating the specific position on the virtual projection surface Sp.

In the present embodiment, for example, the marking image Ii indicates the portion of the virtual projection surface Sp, the portion which includes a predetermined height in the upper-and-lower direction of the vehicle 1. Accordingly, for example, the position of the object and/or the height of the object in the upper-and-lower direction are more easily recognized in the output image Io on the basis of the marking image Ii.

In the present embodiment, for example, the marking image Ii includes the marking images Ii0 (the first marking image) indicating the portion of the virtual projection surface Sp, the portion which includes the same height as the ground surface Gr. Accordingly, for example, a position of the ground surface Gr, a distance from the ground surface Gr to the object and a height of the object from the ground surface Gr are more easily recognized on the basis of the marking image Ii0.

In the present embodiment, for example, the marking image Ii includes the marking images Ii1 (the second marking image) indicating the portion of the virtual projection surface Sp, the portion of which the height is same as the height of the protruding portion 2a protruding or projecting from the vehicle body 2 towards the front side, the rear side or the lateral side of the vehicle body 2. Accordingly, for example, a difference between the position of the object and the position of the protruding portion 2a in the upper-and-lower direction is more easily recognized in the output image Io on the basis of the marking image Ii1.

In the present embodiment, for example, the variably-setting portion 39 may change the virtual projection surface Sp. Accordingly, for example, the output image Io is generated on the basis of the virtual projection surface Sp that is more convenient.

In the present embodiment, for example, the variably-setting portion 39 may change the virtual projection surface Sp in accordance with the speed of the vehicle 1. Accordingly, for example, in the output image Io, a more convenient display mode is easily obtained which is appropriate to the speed of the vehicle 1.

In the present embodiment, for example, in a case where the speed of the vehicle 1 is a first speed, the variably-setting portion 39 may set the virtual projection surface Sp2 where the portion of the virtual projection surface Sp2, the portion which corresponds to the distant part from the vehicle 1, rises up steeply. In a case where the speed of the vehicle 1 is a second speed which is lower than the first speed, the variably-setting-portion 39 may set the virtual projection surface Sp3 gently rising up from the neighborhood of the vehicle 1 towards the portion far from the vehicle 1 or the virtual projection surface Sp2 where the portion of the virtual projection surface Sp2, the portion which corresponds to the neighborhood of the vehicle 1, rises up steeply. Accordingly, for example, in the output image Io, a more convenient display mode is easily obtained which is appropriate to the speed of the vehicle 1.

In the present embodiment, for example, the variably-setting-portion 39 may set the bottom surface Spg in such a manner that the bottom surface Spg in a case where the speed of the vehicle 1 is the first speed is larger than the bottom surface Spg in a case where the speed of the vehicle 1 is the second speed that is lower than the first speed. Accordingly, in a case where the virtual projection surface Sp including the bottom surface Spg and the side surface Sps is used, a convenient display mode based on the speed of the vehicle 1 is easily obtained in the output image Io, for example.

In the present embodiment, for example, the variably-setting-portion 39 may set the virtual projection surface Sp in accordance with the distance from the vehicle 1 to the object existing in the surroundings such that the appropriate portion of the virtual projection surface Sp rises steeply. Accordingly, for example, in the output image Io, a more convenient display mode based on the distance from the vehicle 1 to the object existing in the surroundings of the vehicle 1 is easily obtained.

In the present embodiment, for example, the variably-setting portion 39 may set the virtual projection surface Sp such that the larger the distance Lb1, Lb2 (the second distance) from the vehicle 1 to the projection object B is, the farther the portion P0 (the reference position) is away from the vehicle 1. Accordingly, for example, the distance and/or the size of the projection object B serving as the object to be projected onto the side surface Sps (the second projection surface) is more easily recognized in the output image Io.

In the present embodiment, for example, the variably-setting portion 39 may set the virtual projection surface Sp such that the portion P0 is closer to the vehicle 1 than the projection object B is. Accordingly, for example, the image of the projection object B is restricted from being indicated with a larger distortion or deformation because the image of the projection object B bridges across the bottom surface Spg (the first projection surface) and the side surface Sps over the portion P0 in the output image Io.

The aforementioned embodiment of the present invention is an example and is not intended to limit the scope of the invention. The embodiment may be carried out in other various modes, and various omissions, replacements, combinations and changes may be made without departing from the scope of the invention. Also the embodiment may be carried out in a state where the configurations and shapes in each embodiment are partly changed with each other. In addition, the specifications (for example, a configuration or structure, a kind, a direction, a shape, a size, a length, a width, a thickness, a height, the number, an arrangement, a position, a color, a pattern) of each configuration and/or shape can be appropriately changed and be carried out.

The output image (the displayed image) may be displayed on plural display apparatuses and/or may be displayed on a display apparatus which is separate from the navigation system, for example. The display apparatus may be an apparatuses which reflects an image onto, for example, a windshield and/or a screen inside a vehicle cabin. The display apparatus may be a display panel provided at the dashboard and/or a center console inside the vehicle cabin, for example. The display panel may be provided at a cockpit module, an instrumental panel and/or a fascia, for example.

The marking image is not limited to the image including the line configuration. For example, the marking image may be an image indicating a transparent region through which the viewpoint image is transmitted to be seen, and the specific position may be indicated by an edge of the transparent region. As the virtual projection surface or the virtual projection plane, various shapes and configurations are set.

The first projection surface may be a curved surface, and/or the first projection surface and the second projection surface are a series of curved surfaces. The reference position may be apart from the ground surface towards an upper side. The reference position does not necessarily clarify the boundary between the first projection surface and the second projection surface as long as the reference position has a meaning of the reference which indicates that the virtual projection surface changes. However, the reference position may be a boundary position between the first projection surface and the second projection surface. For example, the reference position may be set at a lower side relative to the position of the imaging portion and/or may be set at a height which is lower than the first height corresponding to the height of the portion of the vehicle. Thus, the distortion or deformation of the image in the output image is restricted. The viewpoint image is not limited to the bird's-eye view image and may be an image seen from a lateral side, for example.

The cross-sectional shape at the cross section which passing through a reference point (the center) of the vehicle and which follows along the vehicle upper-and-lower direction may be the Bezier curve, for example. By setting the Bezier curve, the shape of the cross section of the virtual projection surface can be set more easily. That is, a degree of freedom in setting the virtual projection surface increases easily. In addition, the effect brought by the variable setting of the virtual projection surface is obtained even in a case where the marking image is not included in the output image.

The image processing apparatus for a vehicle of the present invention can be also realized in the mode [1] or the mode [2] which are described below.

[1] An image processing apparatus for a vehicle, the apparatus including:
  a viewpoint image generation portion generating a viewpoint image of a virtual projected image in which a captured image of vehicle surroundings is projected onto a three-dimensional virtual projection surface surrounding a periphery of the vehicle, the viewpoint image being viewed from a virtual viewpoint;
  a marking image generation portion generating a marking image indicating a specific position on the virtual projection surface;
  an output image generation portion generating an output image including the viewpoint image and the marking image;

the virtual projection surface including a bottom surface arranged along a ground surface and a side surface rising from the bottom surface; and the marking image indicating a boundary between the bottom surface of the virtual projection surface and the side surface of the virtual projection surface.

[2] An image processing apparatus for a vehicle, the apparatus including:

a viewpoint image generation portion generating a viewpoint image of a virtual projected image in which a captured image of vehicle surroundings is projected onto a three-dimensional virtual projection surface surrounding a periphery of the vehicle, the viewpoint image being viewed from a virtual viewpoint;

a marking image generation portion generating a marking image indicating a specific position on the virtual projection surface;

an output image generation portion generating an output image including the viewpoint image and the marking image;

a variably-setting portion which may change the virtual projection surface; and the variably-setting portion being capable of changing the virtual projection surface on the basis of data inputted at an input portion.

EXPLANATION OF REFERENCE NUMERALS

1 . . . vehicle, 2 . . . vehicle body, 2a . . . protruding portion, 10a, 24b . . . input portion, 11 . . . ECU (image processing apparatus), 34 . . . viewpoint image generation portion, 35 . . . marking image generation portion, 38b . . . object selection portion (projection object setting portion), 38c . . . distance detection portion, 39 . . . variably-setting portion, Ic . . . captured image, Ip . . . virtual projected image, Ib . . . viewpoint image, Ii . . . marking image, Ii0 . . . marking image (first marking image), Ii1 . . . marking image (second marking image), Io . . . output image, Lb1, Lb2 . . . distance (first distance, second distance), Sp (Sp0 to Sp4) . . . virtual projection surface, Spg . . . bottom surface (first projection surface), Sps . . . side surface (second projection surface), P0 . . . portion (portion including a height that is same as a ground surface, reference position), P1 . . . portion (portion including a first height)

The invention claimed is:

1. An image processing apparatus for a vehicle, the apparatus comprising a processor configured to function as:

a viewpoint image generation portion generating a viewpoint image in which a three-dimensional virtual projection surface surrounding a periphery of a vehicle is viewed from a virtual viewpoint, a captured image of vehicle surroundings being projected onto the virtual projection surface, wherein the virtual projection surface includes a reference position, a first projection surface which is closer to the vehicle than the reference position is, and a second projection surface which is farther from the vehicle than the reference position is and which includes a larger inclination than the first projection surface;

an output image generation portion generating an output image including the viewpoint image;

a variably setting portion configured to change the virtual projection surface in accordance with a circumstance of the vehicle;

a projection object setting portion setting a projection object to be projected onto the second projection surface from among objects existing in the surroundings of the vehicle; and a distance detection portion detecting a second distance from the vehicle to the projection object, wherein the variably setting portion sets the virtual projection surface such that the larger the second distance is, the farther the reference position becomes away from the vehicle.

2. The image processing apparatus for a vehicle according to claim 1, wherein the processor is further configured to function as a marking image generation portion generating a marking image indicating a specific position on the virtual projection surface, the output image generation portion generating an output image including the viewpoint image and the marking image, and the marking image indicates a portion of the virtual projection surface, the portion including a predetermined height in an upper and lower direction of the vehicle.

3. The image processing apparatus for a vehicle according to claim 2, wherein the marking image includes a first marking image indicating a portion of the virtual projection surface, the portion including a height that is same as a ground surface.

4. The image processing apparatus for a vehicle according to claim 2, wherein the marking image includes a second marking image indicating a portion of the virtual projection surface, the portion including a height that is same as a protruding portion protruding at a vehicle body towards a front side, a rear side or a lateral side of the vehicle body.

5. The image processing apparatus for a vehicle according to claim 1, wherein in a case where a speed of the vehicle is a first speed, the variably-setting portion sets the virtual projection surface where a portion of the virtual projection surface, the portion which corresponds to a distant part from the vehicle, rises steeply; and in a case where the speed of the vehicle is a second speed which is lower than the first speed, the variably-setting portion sets the virtual projection surface which rises up gently from a vicinity of the vehicle towards the distant part from the vehicle, or the virtual projection surface where a portion of the virtual projection surface, the portion which corresponds to the vicinity of the vehicle, rises steeply.

6. The image processing apparatus for a vehicle according to claim 1, wherein the variably setting portion sets the virtual projection surface of which a corresponding portion rises steeply in accordance with a distance from the vehicle to an object existing in the surroundings.

7. The image processing apparatus for a vehicle according to claim 1, wherein the variably setting portion sets the virtual projection surface such that the reference position is closer to the vehicle than the projection object is.

8. An image processing apparatus for a vehicle, the apparatus comprising a processor configured to function as:

a viewpoint image generation portion generating a viewpoint image in which a three-dimensional virtual projection surface surrounding a periphery of a vehicle is viewed from a virtual viewpoint, a captured image of vehicle surroundings being projected onto the virtual projection surface, wherein the virtual projection surface includes a reference position, a first projection surface which is closer to the vehicle than the reference position is, and a second projection surface which is farther from the vehicle than the reference position is and which includes a larger inclination than the first projection surface;

a marking image generation portion generating a marking image indicating a specific position on the virtual projection surface;

an output image generation portion generating an output image including the viewpoint image and the marking image;

a variably setting portion configured to change the virtual projection surface in accordance with a circumstance of the vehicle, a projection object setting portion setting a projection object to be projected onto the second projection surface from among objects existing in the surroundings of the vehicle; and a distance detection portion detecting a second distance from the vehicle to the projection object, wherein the variably setting portion sets the virtual projection surface such that the larger the second distance is, the farther the reference position becomes away from the vehicle.

9. The image processing apparatus for a vehicle according to claim 8, wherein the variably setting portion sets the virtual projection surface such that the reference position is closer to the vehicle than the projection object is.

10. An image processing apparatus for a vehicle, the apparatus comprising a processor configured to functions as:

a viewpoint image generation portion generating a viewpoint image in which a three-dimensional virtual projection surface surrounding a periphery of a vehicle is viewed from a virtual viewpoint, a captured image of vehicle surroundings being projected onto the virtual projection surface, an output image generation portion generating an output image including the viewpoint image; and a variably setting portion configured to change the virtual projection surface in accordance with a circumstance of the vehicle, wherein in a case where a speed of the vehicle is a first speed, the variably-setting portion sets the virtual projection surface where a portion of the virtual projection surface, the portion which corresponds to a distant part from the vehicle, rises steeply; and in a case where the speed of the vehicle is a second speed which is lower than the first speed, the variably-setting portion sets the virtual projection surface which rises up gently from a vicinity of the vehicle towards the distant part from the vehicle, or the virtual projection surface where a portion of the virtual projection surface, the portion which corresponds to the vicinity of the vehicle, rises steeply.

11. The image processing apparatus for a vehicle according to claim 10, wherein the processor is further configured to function as a marking image generation portion generating a marking image indicating a specific position on the virtual projection surface, and the output image generation portion generates an output image including the viewpoint image and the marking image.

* * * * *